Dec. 12, 1933.  F. A. SMITH  1,939,234
LOCK STRUCTURE
Filed Oct. 24, 1932  2 Sheets-Sheet 1
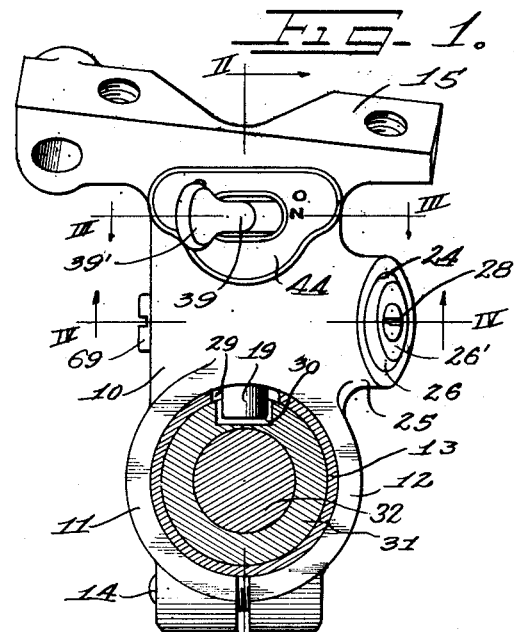
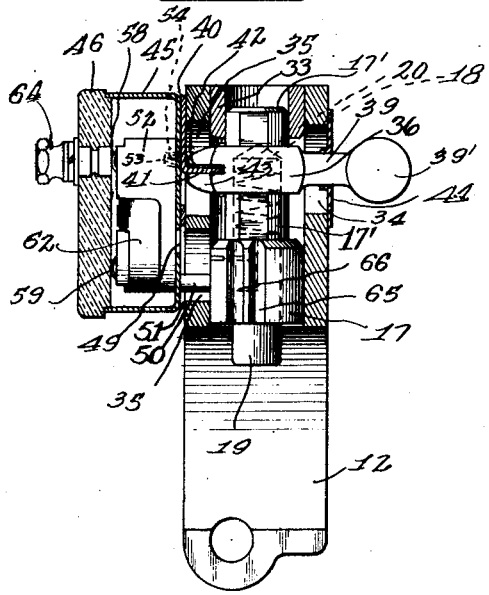
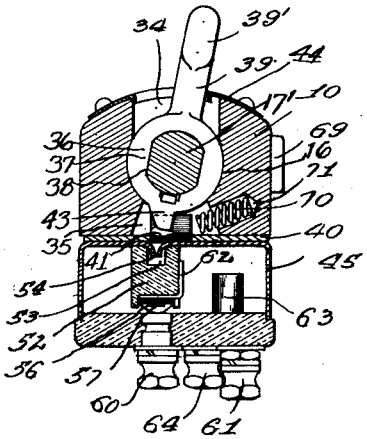
Inventor
Frederick A. Smith.
by
Charles Hill
Attys.

Dec. 12, 1933.                F. A. SMITH                1,939,234
                             LOCK STRUCTURE
                         Filed Oct. 24, 1932          2 Sheets-Sheet 2

Inventor
Frederick A. Smith.
by Charles Hill
Attys.

Patented Dec. 12, 1933

1,939,234

UNITED STATES PATENT OFFICE 1,939,234

LOCK STRUCTURE

Frederick A. Smith, North Chicago, Ill., assignor to Oakes Products Corporation, North Chicago, Ill., a corporation of Michigan Application October 24, 1932. Serial No. 639,315

3 Claims. (Cl. 200—44)

This invention relates to lock structures adapted particularly for use in automotive vehicles and the important object is to produce a unitary structure in which is combined lock bolt mechanism for locking or unlocking the steering of the vehicle, and switch mechanism for controlling the ignition circuit for the automobile engine and the circuit for the starting motor for the engine, and interlocking means whereby the movement of either of said mechanisms at any time is dependent upon the relative position of such mechanisms at such time.

A further object is to provide an arrangement in which the switch mechanism, when released by the interlocking means, may be controlled by a single manually operable actuating element to cause closure of both the ignition circuit and the starting motor circuit, to disconnect the starting motor circuit and maintain only the igniton circuit, and to open and close the ignition circuit independently of operation of the starting motor circuit.

A further object is to provide a compact structure economical of manufacture and assembly, and efficient in operation.

The various features of the invention are incorporated in the structure disclosed on the drawings, in which drawings Figure 1 is a plan view of the lock structure mounted on the steering column of an automobile;

Figure 2 is a section on plane II—II of Figure 1;

Figure 3 is a section on plane III—III of Figure 1;

Figure 4:
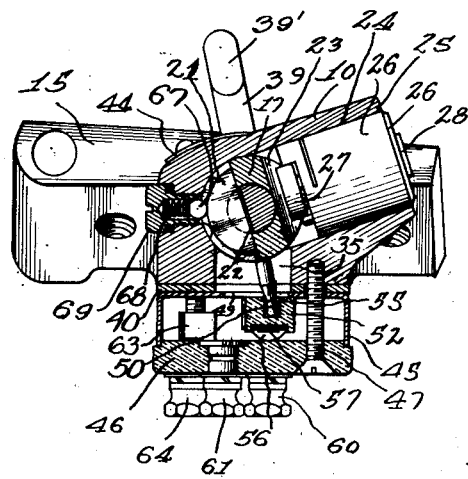
Figure 4 is a section on plane IV—IV of Figure 1.

The lock structure shown comprises a body 10 having at its outer end the semi-annular extensions 11 and 12 for receiving the steering column 13 of an automobile to which the extensions are clamped as by means of a screw or bolt 14. At its inner end the body 10 has the lateral extension 15 by means of which the lock structure may be secured to a suitable support, as, for example, the dashboard of an automobile.

The body 10 has the longitudinal cylindrical bore 16 for receiving the locking bolt 17 whose inner end 17' is of reduced diameter. The bolt has the longitudinal cylindrical pocket 18 for the locking bar 19 and a spring 20, the spring tending to shift the bar outwardly. To limit the movement of the locking bar, a stop in the form of a plate 21 extends into the slot 22 in the bar, the plate being suitably supported by the body 10.

The bolt 17 has the transverse notch or channel 23 which registers with the cylindrical passage 24 extending laterally through the body 10 and the extension 25 thereon. This passageway 24 receives a lock cylinder 26 whose barrel 26' terminates at its inner end in a cam 27 arranged eccentrically relative to the barrel axis, and this cam extends into the slot 23 of the locking bolt, so that when the lock barrel is turned by means of a suitable key applied in the keyhole 28, the lock bolt will be shifted axially. The extent of rotation of the lock barrel is 180° so that at the end of the lock operation the bolt will be locked at either its inner or outer position by the cam 27.

When the lock bolt is shifted outwardly by turning of the key the lock bar 19 will extend through the passageway 29 in the steering column 13 and into the notch 30 in the collar 31 secured to the steering post 32, and the steering post will be locked. If the steering wheel is not in the proper position (usually neutral position) when the lock bolt is shifted outwardly, the lock bar 19 will hold the spring 20 against the cylindrical face of the collar 31, and then when the steering wheel is brought around to position for registration of the notch 30 with the passageway 29, the locking bar will be projected by the spring into the notch and the steering will be locked.

Secured in the inner end of the bore 16 is a bushing 33 for receiving the reduced end 17' of the locking bolt. Adjacent to this bushing the body 10 has the front passageway 34 and the rear passageway 35 which communicate with the bore 16. Within the bore 10 is the hub 36 which is keyed to the bolt end 17' as by means of a key extensions 37 engaging the flat sides 38 of the bolt, the bolt being however free to slide axially relative to the hub. Extending forwardly from the hub through the front passageway 34 is the lever arm 39 terminating in a flat finger engaging end 39' by means of which lever the hub may be readily rotated. Engaging against the rear side of the body 10 is a plate 40 having a section deflected therefrom to form a tongue 41 for engaging in the radial slot 42 through the abutment extension 43 on the hub, this abutment extension being in the rear passageway 35. Covering the outer end of the front passageway 34 is the escutcheon plate 44, this plate and the tongue 41 serving to hold the hub 36 against axial movement relative to the body 10.

Figure 6:
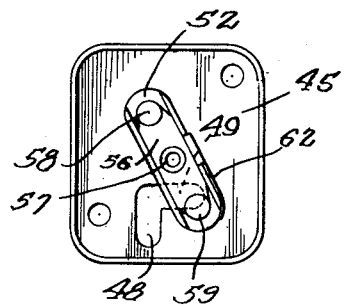
Figure 6 is a plan view of the switch housing with the cover removed.

Seating with its base against the plate 40 is the rectangular switch housing 45 closed by a detachable cover 46 preferably of insulating material, bolts 47 extending through the cover, the base of the housing, and the plate 40 and threading into the body 10 to thus secure these parts rigidly to the body. In the base of the housing 45 is a longitudinally extending slot 48 with a transverse slot 49 extending from the inner end thereof, as clearly shown in Figure 6, for cooperation with a pin 50 extending radially from the locking bolt 21, the plate 40 having clearance passageway 51 therethrough for the pin. When the lock bolt is in its outer or steering locking position the pin 50 will project through the longitudinal slot 48 so that the lock bolt will be held against rotational movement and the hub 36 cannot then be rotated. However, when the lock bolt has been shifted to its unlocking position the pin will come into registration with the transverse slot 49 and the bolt is then rotatable with the hub 36 when this hub is rotated by swing of the lever 39. When the pin is within the transverse slot the locking bolt cannot be shifted back to locking position but must first be rotated to bring the pin back into registration with the longitudinal slot 48. Within the housing 45 and seated against its base is a rectangular switch block 52 which in its base at its inner end has a pocket 53 for receiving a pivot projection 54 which may be deflected from the base of the housing 45, the switch block being thus pivoted or supported for swinging movement. In its base and at its outer end the switch block has the longitudinally extending channel 55 into which the pin 50 projects so that the switch block is swung when the locking bolt is rotated. When the locking bolt is in its outer or locking position, the channel 55 is parallel with the bolt axis so that when the bolt is shifted inwardly to unlocking position the pin 50 will move along the channel 55 without swinging the switch block, but when the pin reaches the transverse slot 49 and the bolt is rotated the switch block will be swung.

On the back of the switch block is a longitudinally extending switch blade 56 secured intermediate its ends as by a rivet 57, the beaded ends 58 and 59 of the switch blade cooperating with the inner ends of terminal posts 60 and 61 respectively, these posts being secured to the cover 46. The post 60 is coaxial with the pivot post 54 for the switch block so that the end 58 of the switch blade is always in electrical engagement with the post 60. When the locking bolt is in its outer or locking position, the switch block and blade are parallel therewith and the terminal post 61 is located so that the end 59 of the switch blade is disconnected from the post but will be brought into electrical engagement therewith when the lock bolt has been shifted inwardly and has been rotated.

The switch block has also a side contact plate 62 held in electrical engagement with the switch blade 56 by the rivet 57. Mounted on the inner side of the cover 46 is a contact arm 63 with which the terminal post 64 is connected, the end of the arm being adjacent to the inner contact face 61' of the terminal post 61, such face being preferably of extended area. With this arrangement when the switch block is swung its switch blade will first engage with and electrically connect terminal posts 60 and 61 and then when the swinging movement is continued a short distance the side contact plate 62 will be brought into engagement with the contact arm 63, the end 59 of the switch blade maintaining engagement with the extended face 61' of the terminal post 61 during such contact of the side contact plate with the contact arm.

To yieldingly hold the locking bolt against rotary movement after a rotation thereof it is provided with longitudinally extending grooves 65 and 66 to be engaged by a ball 67 pressed by a spring 68 held within a plug 69 which is threaded into a suitable opening in the lock body 10. When the lock bolt is in its locking position the ball will be in the groove 65 and when the bolt has shifted to unlocking position and has been rotated to swing the switch blade into engagement with the terminal 61, the ball will be within the groove 66 to yieldably hold the bolt in these positions. Upon further rotation of the bolt by swing of the lever 39 the switch block is moved a distance further to bring its side contact 62 in engagement with the contact arm 63 and during such movement the ball 67 will be partially raised out of the groove 66 and will tend to roll back into the groove and correspondingly rotate back the lock bolt to the position where the switch blade will be electrically disconnected from the contact arm 63. I preferably provide more positive means for swinging the switch block back to this intermediate position when the lever 39 has been released after swing thereof to shift the switch block with its side contact against the contact arm 63. As shown, I provide a spring 70 seated in a pocket 71 in the body 10 and projecting into the path of the abutment extension 43 on the hub 36 from which the lever 39 extends. After the hub 36 has been turned by the lever 39 and the locking bolt correspondingly rotated to cause swing of the switch block for engagement of the terminals 60 and 61, further movement of the switch block toward the contact arm 63 will be resisted by the spring 70 which is then engaged by the abutment extension 43, and, when the lever 39 is then released after a period of contact of the switch blade with the contact arm 63, the spring 70 will swing the hub 36 back to its intermediate position for engagement by the switch blade with the terminals 61 and 63.

Figure 5:
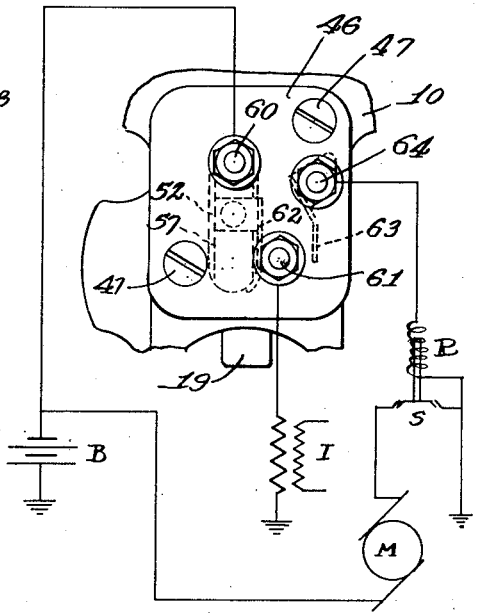
Figure 5 is a rear elevation.
Figure 7:
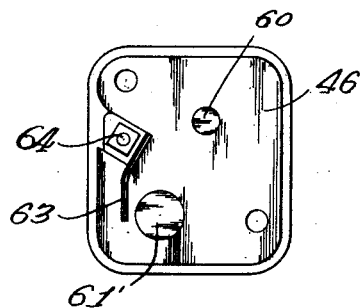
Figure 7 is an inner side view of the cover for the switch housing.

On Figure 5 I have shown one circuit arrangement for control by the switch mechanism. One terminal of the battery B is connected with the terminal post 60 and the other terminal of the battery is connected with ground. The terminal post 61 is connected with one terminal of the primary winding of an ignition coil I, the other terminal of the winding being grounded. The terminal post 64 is connected with one terminal of the winding of a relay R whose other terminal is connected with ground and this relay operates a switch S connected in the circuit of the vehicle engine starting motor M which circuit extends from the positive side of the battery thru the motor, the switch, and to ground.

Describing now the operation, when the lock bolt is in its outer or steering locking position the switch blade of the switch is connected only with the battery terminal post 60. The pin 50 being in the longitudinal slot 48 will lock the bolt against rotation so that the lever 39 cannot be swung to operate the switch. When the lock is turned by means of a suitable key, the lock bolt may be shifted inwardly to unlocking position to carry its pin 50 into the transverse slot 49 and then the bolt will be free for rotational movement. When the lever 39 is now swung to the right a distance to remove the groove 65 of the bolt from the ball 67 and to bring the groove 66 into registrtaion with the ball, the switch block will be swung by the pin 50 to carry its outer end into engagement with the face 61' of the terminal post 61 and the ignition coil will then be supplied with current from the battery. A little further swing of the lever 39 to the extreme right position thereof will swing the switch block to carry its side contact against the contact arm 63 without disengagement of the switch blade from the contact face 61' and then battery current will also be supplied to the winding of the relay R which really then draws up its armature for closure of the switch S and inclusion of the starting motor in circuit for starting of the engine. When the engine has been started and is self-operating the lever 39 is released whereupon the spring 70, assisted by the spring 68 and ball 67, will bring the lever 39 back to intermediate position where only the ignition circuit is closed, this being then the position for running of the engine. Should the engine at any time accidentally stop, the lever 39 is advanced to the right until the relay circuit is again closed and the engine has been restarted. Usually the operator will swing the lever 39 in one continuous movement from its extreme left position to its extreme right position for starting of the engine and then release the lever for disconnection of the starting motor. When the lever is in position for closure of the ignition circuit or closure of both the ignition and starting circuits, the pin 50 will be within the transverse slot 49 so that at this time the bolt cannot be shifted outwardly into locking position, but the lever must first be swung back to switch opening position to carry the pin 50 back to the longitudinal slot 48 and then by means of the key and the lock the bolt can be shifted outwardly to its steering locking position and when in such position the lever 39 cannot be swung and the switch will be held open.

I have shown a practical and efficient embodiment of the various features of my invention but I do not desire to be limited to details shown and described, as changes and modifications may be made without departing from the scope of the invention as outlined in the appended claims.

I claim as my invention:

1. In a switch structure, the combination of a switch block pivoted at one end for swinging movement thereof, a switch blade on one face of said block and a side contact thereon electrically connected with said blade, an electrical terminal member permanently in contact with said switch blade at the pivoted end of said block, a lever for swinging said block, a second circuit terminal engageable by the free end of said switch blade when said block is swung a distance in one direction, a third terminal member engaged by the side contact on said block upon continued swing of said block, and key-controlled means for locking said switch lever against operation.

2. In a switch structure, for the purpose described, the combination of a switch housing, a switch block within said housing seated on the bottom thereof, means pivoting said block at one end thereof, a lever, a connection between the other end of said switch block and lever for causing swing of said block when said lever is rotated, a switch blade on the outer face of said block having a part extending downwardly therefrom to form a side contact on said block, a first circuit terminal on said housing permanently electrically engaged with said switch blade at the pivot end of said block, a second switch terminal adapted for engagement by the free end of said switch blade when said block is swung, a third circuit terminal on said housing having an arm extending into the path of said side contact on said block for engagement thereby upon further movement of said block and without disengagement of said switch from said second circuit terminal, and key-controlled means for locking said lever against operation.

3. In switch structure for the purpose described, the combination of a supporting body, an actuating lever supported by said body and manually operable from the front thereof, a switch housing on the back of said body, a switch block within said housing seating against the bottom thereof, a switch blade on the outer face of said block and having a part extending along one side of said block to form a side contact, a circuit terminal supported by said housing and having permanent eelctrical engagement with said switch blade, a second circuit terminal on said housing for engagement by said switch blade, a third circuit terminal on said housing having an arm extending therefrom into the path of said side contact, a connection between said lever and said block whereby swing of said lever will first move said block to an intermediate position for engagement with said second circuit terminal and then to a final position for engagement of said side contact with said contact arm and without disconnection of said switch blade from said second terminal, an abutment on said lever, a spring supported on said body to be engaged by said abutment to resist swing of said lever for movement of said block from its intermediate position to its final position and for returning said block to its intermediate position when said lever is released, and key controlled means for locking said lever against operation.

FREDERICK A. SMITH.